United States Patent [19]

Jephcott

[11] Patent Number: 4,484,648

[45] Date of Patent: Nov. 27, 1984

[54] ULTRA NARROW ENCLOSED MOTOR VEHICLES

[76] Inventor: Edmund F. Jephcott, Fern Hill, Fairwarp, Uckfield, Sussex TN22 3BU, England

[21] Appl. No.: 238,596

[22] PCT Filed: Jun. 29, 1979

[86] PCT No.: PCT/GB79100107

§ 371 Date: Mar. 1, 1981

§ 102(e) Date: Feb. 26, 1981

[87] PCT Pub. No.: WO81/00088

PCT Pub. Date: Jan. 22, 1981

[51] Int. Cl.³ .................. B60G 17/00; B62D 61/06
[52] U.S. Cl. .................. 180/210; 280/112 A
[58] Field of Search .............. 180/210, 215, 217; 280/112 A

[56] References Cited

U.S. PATENT DOCUMENTS

| 4,003,443 | 1/1977 | Boughers | 180/217 |
| 4,020,914 | 5/1977 | Trautwein | 180/210 |
| 4,064,957 | 12/1977 | Parham | 180/215 |
| 4,065,144 | 12/1977 | Winchell | 180/217 |
| 4,126,322 | 11/1978 | Mika | 280/6.11 |
| 4,368,796 | 1/1983 | Patin | 180/215 |

FOREIGN PATENT DOCUMENTS

| 548491 | 12/1956 | Belgium . |
| 817173 | 5/1937 | France . |
| 1158922 | 3/1958 | France . |
| 2243103 | 4/1975 | France . |
| 2338836 | 8/1977 | France . |
| 1149079 | 4/1969 | United Kingdom . |

Primary Examiner—John A. Pekar
Attorney, Agent, or Firm—Barnes & Thornburg

[57] ABSTRACT

A narrow enclosed motor vehicle has a chassis supported by road-running wheels and a body structure for at least one person mounted so as to be inclinable relative to the median plane of the vehicle and at least a part of the chassis structure, inclination being controlled by driver-operated pedals mounted to the inclinable section of the vehicle and so connected that depression of either pedal causes the vehicle body to tilt towards the same side of the median plane of the vehicle as the depressed pedal.

4 Claims, 21 Drawing Figures

ULTRA NARROW ENCLOSED MOTOR VEHICLES

BACKGROUND OF THE INVENTION

This invention relates to motor vehicles for use in congested traffic conditions.

THE PRIOR ART

Cycles and motor cycles travel through a congested traffic zone more easily than conventional four wheeled vehicles whereby the width of a vehicle is an important factor amongst causes of congestion in traffic. However, a grave practical disadvantage when using two wheeled vehicles is that they do not provide the user with all round weather protection and usually require special clothing. A further disadvantage is the lack of user protection in comparison with a four wheeled enclosed vehicle in the event of an accident.

Even though the relatively narrow width of two wheeled vehicles enables them to manoeuvre relatively easily through congested traffic a serious disadvantage is their low speed instability. Whilst the tricycle as known avoids such instability it not only has high speed instability but also lacks all round weather protection.

Presently known closed-in vehicles usually have a width of one and one half meters upwards, with the minimum width usually being governed by reasons of safety so that the width cannot be readily reduced.

Tricycles having articulated chassis constructions and arrangements for enabling relative tilting between such articulated sections are known.

Spring arrangements acting between the wheel suspension arrangements and the remainder of the vehicle for producing relative movements there between such that the vehicle always tends to return to its upright position are also known.

OBJECT OF THE INVENTION

An object of the invention is to provide a closed-in vehicle which has a width which is relatively narrow as compared with the widths of vehicles commonly used at the present time.

SUMMARY OF THE INVENTION

According to the invention there is provided a road vehicle characterised by a chassis supported by road running wheels, a closed-in body structure providing accommodation for at least one person and all round weather protection for such persons, a tilt enabling connection between the body structure and at least a part of the chassis whereby relative tilting movement can take place between the body structure and a road surface on which the vehicle rests, the tilting being along a tilting axis extending in the longitudinal direction of the vehicle, and means for enabling variable selection of the amount and sense of said relative tilting movement.

BRIEF DESCRIPTION OF THE DRAWINGS

For a better understanding of the invention reference will now be made to the accompanying drawings in which;

FIG. 4 is a side view of FIG. 3, FIG. 5 schematically shows a first embodiment of a tilt control hydraulic system for use with the arrangements of the previous Figures, FIG. 6 schematically shows a second embodiment of a tilt control hydraulic system for use with the arrangements of FIGS. 1 to 4.

DESCRIPTION OF THE PREFERRED EMBODIMENTS

Figure 1:
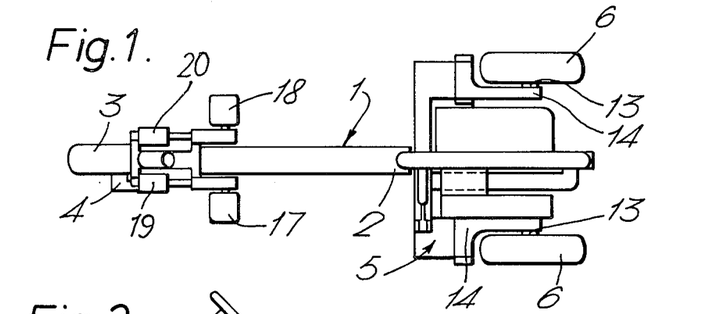
FIG. 1 schematically shows a first embodiment of a chassis structure of a vehicle incorporating features of the invention, the vehicle body structure being omitted.
Figure 2:
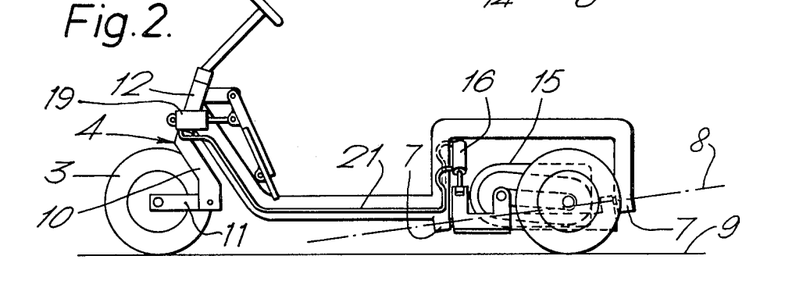
FIG. 2 is a side view of FIG. 1.

FIGS. 1 and 2 illustrate a chassis assembly for a three wheeled vehicle including a first section 2 for supporting a vehicle body structure (not shown) and from which a single road wheel 3 is carried by way of a suspension unit 4, and a second section including a sub-frame 5 which carries a pair of rear wheels 6. The body structure is such as to provide for all round weather protection for the occupant or occupants, and, in practice, includes elements conventionally associated with a closed-in body, i.e., seats, lights, door or doors, windscreen and the like.

A pivotal arrangement 7 connects the chassis section 2 and the sub-frame 5 for pivotal movement about a pivot axis 8 inclined to the horizontal or ground level 9 and extending longitudinally of the vehicle.

In an alternative construction (not shown) the suspension pivots of the wheels may be used to enable the vehicle to be tilted inwards on cornering. In this case the wheels can be interconnected resiliently by way of a pivoted sub-frame or transverse arm or arms arrangement through which the tilting can be positionally controlled.

The suspension unit 4 includes a main bracket or the like 10 connected to the wheel 3 through a shock absorber arrangement 11 and which is coupled to the steering column.

The rear wheels are independently suspended from separate linkages 14 connected with the sub-frame 5. Alternatively, the wheels 6 may be carried from a common live axle (not shown) which is connected to the sub-frame 5 through suitable springing or other shock absorbers (not shown).

The sub-frame 5 carries a vehicle drive means 15 and associated transmission assembly or unit 15A, and where applicable, clutch arrangements centrifugally operable or otherwise. The drive means 15 can be an electric motor or any suitable form of internal combustion engine, and can drive one or both rear wheels.

With an electric motor front wheel drive may be used batteries. The batteries supplying the motor can be conveniently mounted upon the sub-frame 5.

Since various forms of vehicle which could be adopted are very well known detailed description is not thought necessary.

Figure 3:
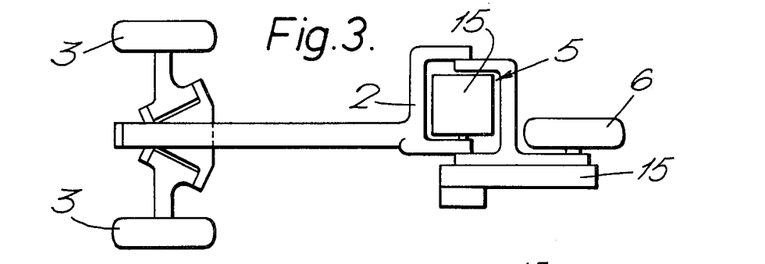
FIG. 3 schematically shows a second embodiment of a chassis structure of a vehicle incorporating features of the invention, the vehicle body structure being omitted.
Figure 4:
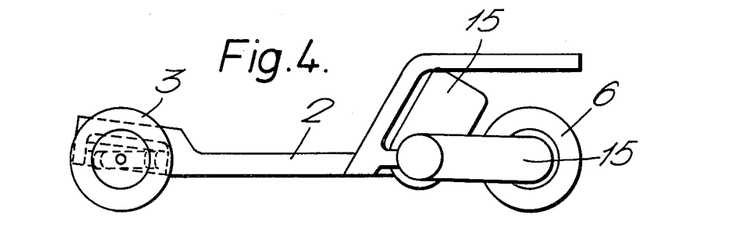

In the FIGS. 3 and 4 embodiment the wheel arrangements are reversed with the double wheels 6 at the front.

Since steering mechanisms for double wheels are well known it is not thought necessary to provide a detailed description thereof as conventional steering arrangements can be used. Also since the general form of the FIGS. 3 and 4 embodiment is otherwise similar to that of the FIGS. 1 and 2 embodiment detailed further description is not thought necessary.

Hydraulic means 16 are provided for producing and controlling the relative tilting of the chassis section 2 and the sub-frame 5 induced for the purposes of steering and/or manoeuvring or to correct for any tilt which may be induced during operation of the vehicle as a result of road or other external conditions.

The vehicle has driver operated pedals 17 and 18 connected via hydraulic cylinders or rams 19 and 20 to adjust the setting of the operating means 16 through conduits (only one shown) 21. Depression of the pedal 17 tilts the section 2 to the left relative to the sub-frame 5, whilst depression of the pedal 18 produces tilt in the opposite direction. As the extent of tilt is related to the extent of pedal depression a selectivity variable amount of tilt in either direction can be produced as and when desired by simple pedal actuation which latter can be servo actuated or can incorporate a mechanical means for providing increased leverage and increased pedal pressure.

As possible alternatives to a purely hydraulic system, the pedals can be connected either mechanically by means of cable, rods, levers or the like or by pneumatic or electromagnetic coupling means to the tilting mechanism.

As an alternative means of manual tilt control the steering wheel or bar may be moved laterally, or tilted about an axis perpendicular to the axis of the steering column, to induce and control tilt; this action may also be servo-assisted.

Figure 5:
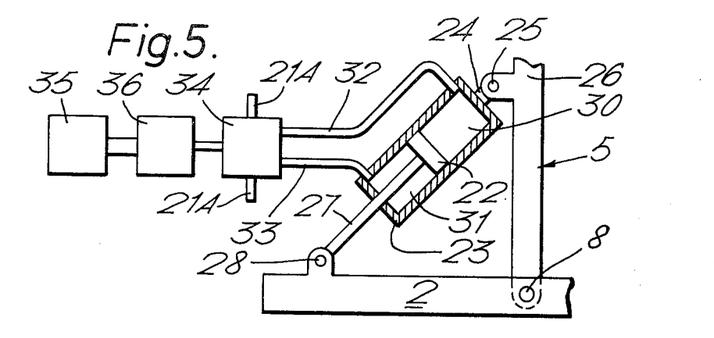

FIG. 5 shows schematically an automatic system for tilt control. In the arrangement shown the operating means 16 includes a double acting piston 22 movable in a cylinder 23 connected by a link 24 and a pivot 25 to a part 26 of the chassis section 2. The piston rod 27 is connected by a pivot 28 to the sub-frame 5, whereby any tilt of the section 2 about the axis 8 produces relative displacement between the piston 22 and the cylinder 23.

The piston and cylinder arrangement produces two chambers 30 and 31 in the cylinder 23 which are respectively connected by fluid conduits 32 and 33 to a valve arrangement 34. A motor 35 drives a hydraulic pump 36 coupled fluidwise with the valve arrangement 34. If desired, the drive means 15 can be used to drive the pump 36. Movement of the piston 22 to reduce the volume of chamber 30 increases the pressure therein and reduces pressure in chamber 31, whilst movement in the opposite sense reverses the pressure changes.

The valve 34 can comprise a directional flow control valve (not shown) and a flow control valve (not shown) which are operated by fluid within conduits 32 and 33.

The above described arrangement is such that pressure arising in one chamber 30 or 31 through displacement of the vehicle body structure by an external lateral force, e.g., centrifugal force on a corner, causes fluid to be pumped into that chamber 30 or 31 while fluid is simultaneously exhausted from the other chamber 31 or 30, with the effect that the vehicle body is tilted against the external force until this is exactly balanced by gravitational force acting on the inclined vehicle. As the point of equilibrium is approached the pressure in the first mentioned chamber 30 or 31 falls, causing the flow of fluid in that chamber 30 or 31 to be reduced proportionally by the valve arrangement 34. At the point of equilibrium the pressure in the two chambers 30 and 31 is equalised. When the external lateral force comes to an end, e.g., at the end of a corner, pressure rises in the second chamber 31 or 30 through the now unbalanced gravitational force, fluid is therefore pumped into this chamber 31 or 30 and the process described above reverses until the vehicle body is restored to the upright position. This is, therefore, a 'positive feed-back' mechanism whereby any external lateral force acting on the vehicle is automatically and instantly compensated by a lateral displacement of the centre of gravity of the vehicle through a force exerted from within the vehicle. This can also be expressed by saying that the effective centre of gravity is maintained constantly at or near the longitudinal centre plane of the vehicle.

Figure 6:
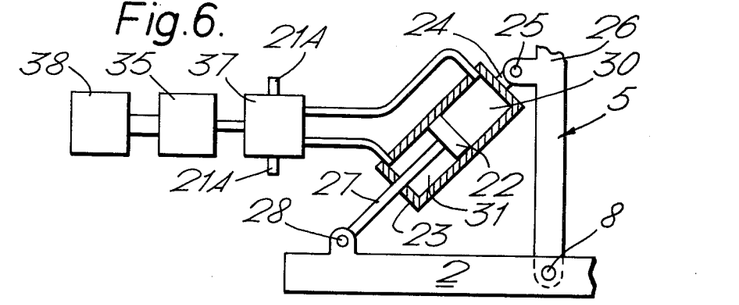

An alternative automatic hydraulic tilting mechanism is schematically shown in FIG. 6 and comprises essentially the same components as just described except that the valve arrangement 34 is not pressure actuated from the piston and cylinder arrangement 22,23 but incorporates a pendulum, spring-loaded weight or like device 37 which is displaced by centrifugal force acting on the vehicle or by lateral inclination of the body structure. Movement of this device regulates the flow of pressurised fluid from a source 38 into and out from the cylinder chambers 30 and 31 in such a way that a force is exerted on the tilting mechanism which, by laterally displacing the centre of gravity of the vehicle exactly compensates the external lateral force acting on the vehicle.

In an alternative arrangement the same effect is produced by electro-mechanical means. In this case a pendulum or like device 37 regulates e.g., by resistance change the current passing through an electro-mechanical actuator acting between the main chassis section 2 and the sub-frame 5 and capable of rotating one relative to the other along the pivot axis, in such a way that a force is exerted on the tilting mechanism which, by laterally displacing the centre of gravity of the vehicle compensates the lateral force acting on the vehicle.

Alternatively, automatic tilt control can be effected electronically, inputs from sensors measuring angular steering movement, road speed, lateral angle of road surface, and lateral pressure on bodywork being coordinated by an electronic device such as a microprocessor arranged for controlling the valve arrangement 34, or an electro-mechanical actuator, in such a way that the body is maintained in equilibrium under all conditions.

Instead of fully automatic control of tilt mechanisms such as above described partly automatic variants thereof could be used. For example, these partly automatic arrangements could involve controls, such as foot pedals, operated by the driver and connected by suitable control connections to the valves 34. In a particular case, the valves 34 can have associated therewith control fluid inlets 21A connected with the driver operated pedals so that fluid flow in the conduits 32 and 33 can be influenced by the driver independently of lateral forces on the vehicle whereby the driver can, if desired, tilt the vehicle in anticipation of centrifugal force when entering a corner or counteract wind pressure before it has significantly displaced the body structure from the vertical.

The above described hydraulic form of driver control could, in an automatic system, be replaced by mechanical or electrical systems enabling driver control of the piston movements or by control systems involving combinations of hydraulic, hydro-pneumatic, mechanical or electrical control arrangements. In practice, the particular combination used will be related to the overall design and construction of the vehicle.

Alternatively, in a further partly automatic variant the tilt control mechanism may have associated with it control connections actuated by the steering mechanism, in such a way that steering movement induces tilt in anticipation of centrifugal force, the amount of tilt being then automatically controlled in the manner described earlier to maintain the vehicle body in equilibrium.

In the above partly automatic arrangements the references to foot pedals operated by the driver can be regarded as including the alternative possibility of an additional function of the steering wheel or bar.

Figure 7:
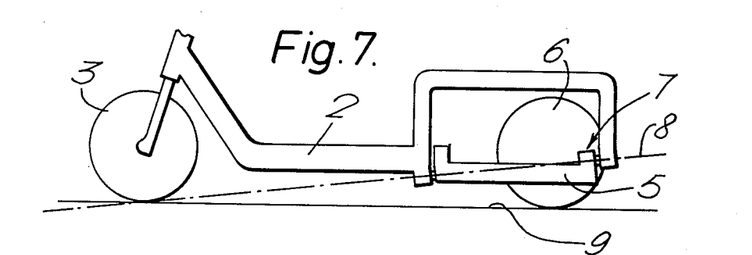
FIG. 7 is a schematic side view illustrating a first position for the pivotal axis between the major sections of the chassis.
Figure 8:
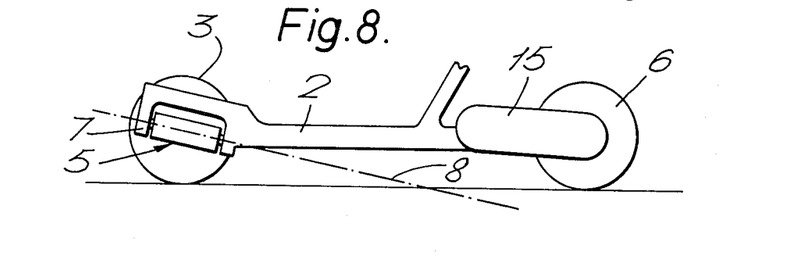
FIG. 8 is a schematic view similar to that of FIG. 7 illustrating a second position for the pivotal axis.

It will be understood that the inclination of the pivot axis 8 can be at any inclination within a range of angles and that the actual inclination would be a factor set by the construction of the vehicle. FIGS. 7 and 8 illustrate possible positions for the axis 8. Thus in FIG. 7 the axis 8 passes through the point of contact between the single road wheel 3 and the road, thereby allowing the vehicle body structure to be tilted without causing the sub-frame 5 to rotate relative to the chassis section 2 in the horizontal plane and thereby to exert steering forces on the vehicle.

The pivot axis 8 may also be inclined more steeply as is shown in FIG. 8 such that the axis passes at road level 9 through a point well within the vehicle wheelbase, thereby giving a vehicle of self centring tendancy towards the upright position, produced by its own weight acting downwards. In addition, it would, in the case of a vehicle with double front wheels, produce a self steering effect when the vehicle is tilted thereby producing steering effects similar to those of a two-wheeled vehicle.

The vehicle may be fitted with a device for locking the body in an upright position while stationary or at very low speed. This device may be automatically actuated by a centrifugal mechanism attached to the transmission system.

Figure 9:
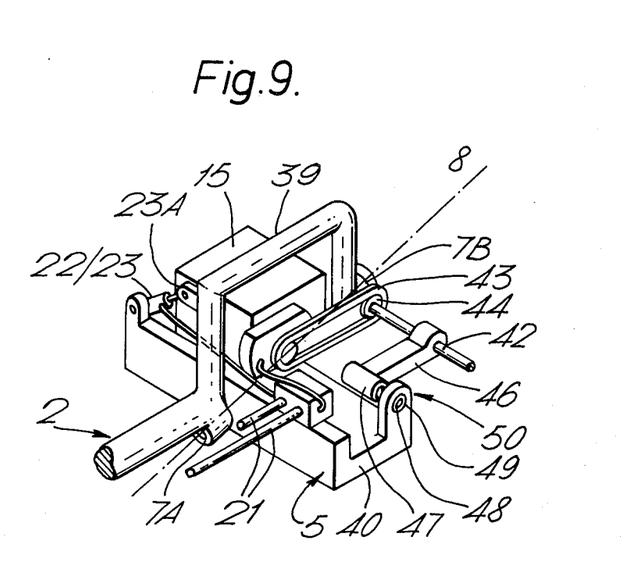
FIG. 9 is a perspective view of an embodiment of a pivot arrangement between the two major sections and also of a drive means for the vehicle.

FIG. 9 shows in essentially schematic form and in more detail the pivotal connected between the frame sections and also the relationships between the drive means and the road wheels (not shown in FIG. 9).

In FIG. 9 the chassis section 2 includes a crank shaped frame part 39 respectively provided at the ends thereof with pivot parts 7A and 7B which co-operate to provide the pivotal connection between the section 2 and the sub-frame 5. The sub-frame 5 includes a transversely directed platform 40 which extends for substantially the whole width of the vehicle, and which provides a mounting for the drive means 15 and transmission unit 15A providing drive from the unit 15 to an axle 42 for the rear wheels. For convenience the axle 42 is shown as a live axle as compared with the stub axles shown in previous Figures. The transmission 15A is shown as including a belt 43 engaging with a pulley 44 driven by the drive means 15 and with a second pulley 45 on the axle 42. The axle 42 is carried from suspension arms 46 suitably supported from the platform 40 by way of a pivotal connection 47 permitting a rocking movement.

A shock absorber unit 48 is provided for each suspension arm. In the FIG. 9 this is shown as the type including an axle 49 serving for the pivotal connection in conjunction with a sleeve 50 at the end of the associated arm 46 and a rubber or other suitable material sleeve which is bonded or otherwise secured to the axle and sleeve combination 49,50 in such manner that it tends to resist any pivotal movement of the arm relative to the sub-frame 5.

The previously discussed double acting piston and cylinder arrangement is connected between the frame part 39 by way of a part 23A and a convenient location of the platform 40 and thus the sub-frame 5.

The associated valve and pump assemblies 34,35 or 37,38 are mounted on the platform.

It will be understood that the live axle could be replaced by stub axle arrangements.

Also in FIG. 9 the conduits 21 are indicated.

In practice, the road wheel suspension movements may be controlled by suitable damping arrangements commonly used on vehicles. For example, springs, rubber or other suitably flexible materials in compression, tension or shear. Alternatively or in addition the suspension movements may be controlled by hydraulic or pneumatic control arrangements.

Thus the double wheels may be additionally connected by a flexible member restricting the independent movement of these wheels under suspension loads in order to reduce that part of the lateral movement of the body structure which is not controlled by the tilting mechanism.

The body structure should be capable of accommodating one or more persons. Conveniently, the passenger seat would be located behind that of the driver thereby enabling a very narrow construction for example, 700 to 900 millimeters in width.

The body structure will be rigidly mounted upon the main section 2 and will fully enclose the passenger compartment as well as that for the driver. Also the body structure will accommodate all of the controls for the vehicle and will be provided with features common to conventional car bodies such as door or doors, an openable window or windows, a windscreen, a windscreen wiper, a heater and the like.

Figure 10:
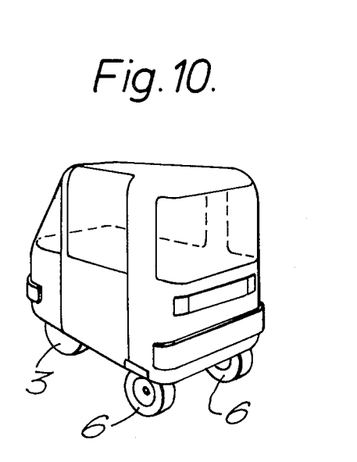
FIGS. 10 and 11 are schematic views of a possible body structure of the vehicle, FIG. 12 schematically shows an embodiment of a pivoted transverse arm construction for use with a vehicle incorporating features of the invention.
Figure 11:
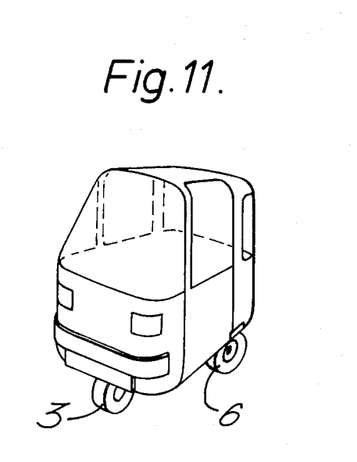

FIGS. 10 and 11 schematically show a possible design for the overall shape or form of the body which affords all round weather protection for the occupants. If desired the roof section may be partly or wholly removeable.

A vehicle incorporating the features of the invention may have four road wheels, which would be suspended from a suitable chassis to which the body structure would be connected by means of longitudinally directed pivot arrangements to enable the required tilting of the body structure relative to the road by any of the arrangements previously considered.

In the case of four wheeled forms of the vehicle the pivot axis therefor may be parallel to the horizontal A further four wheeled configuration may have an additional sub-frame carrying two road wheels in place of the single front wheel (or rear wheel) this additional sub-frame being tiltable relative to the main chassis in a manner similar to those previously discussed.

Figure 12:
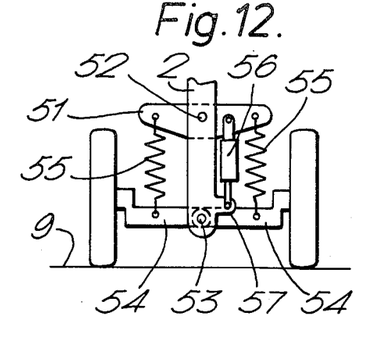
Figure 13:
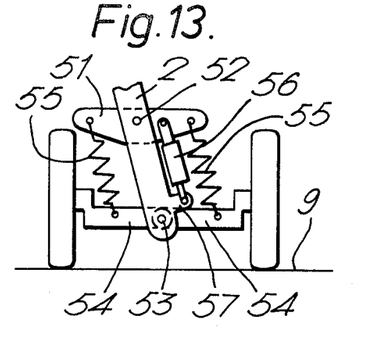
FIG. 13 illustrates the transverse arm construction of FIG. 12 when in a second operational setting.

FIGS. 12 and 13 illustrate a first embodiment of a pivoted arm arrangement in which the sub-frame as such is omitted and is replaced by a transverse arm 51 pivoted by a pivot 52 to the main section 2 at a location vertically above a pivot point or points 53 of suspension arms 54 connecting with the road wheels 6. The ends of the transverse arm 51 are connected by springs 55 with the suspension arms 54 at locations spaced from the pivot points 53.

In addition, a double acting hydraulic cylinder unit 56 serving as a tilt control means is connected between the arm 51 and a lever arm 57 on the main chassis section 2 so that the unit 56 is arranged in a vertical or otherwise conveniently inclined position when the arms 51 and 54 are parallel to each other and also horizontal.

FIG. 12 illustrates the rest position of the arms 51 and 54 in which the body structure (not shown) is not tilted. FIG. 13 illustrates the relative positioning of the above mentioned components when the body structure is tilted.

The suspension arms can connect with the wheels through stub axle arrangements. Also the suspensions for the wheels can include shock absorbing arrangements of any one of the types conventionally used with motor vehicles.

Figure 14:
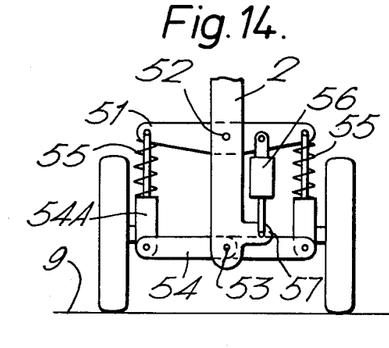
FIGS. 14 and 15 are views similar to FIGS. 12 and 13 of a second transverse arm construction.
Figure 15:
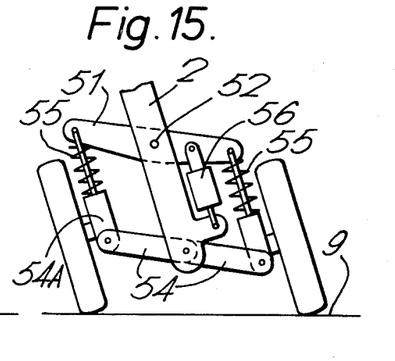

FIGS. 14 and 15 are views similar to those of FIGS. 12 and 13 except that the stub axles are mounted rigidly to resiliently compressible struts 54A pivoted at their upper ends to the arm 51 and at their lower ends to the arms 54. This is an adaptation of the well known McPherson Strut principle. In this arrangement the wheels tilt with the vehicle as is indicated in FIG. 15.

Figure 16:
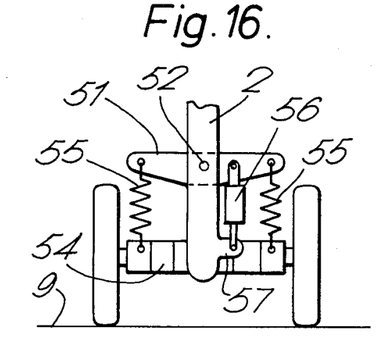
FIGS. 16 and 17 are likewise views similar to FIGS. 12 and 13 of a further transverse arm construction.
Figure 17:
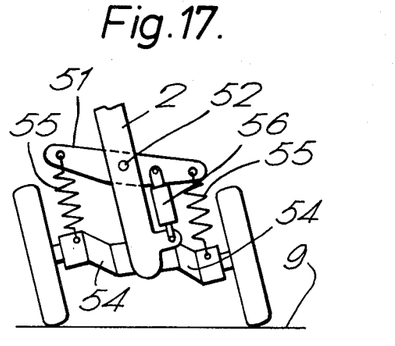

FIGS. 16 and 17 are also views similar to those of FIGS. 12 and 13, except that in the arrangement of FIGS. 16 and 17 the suspension arms have pivot axes arranged transverse to that of the transverse arm pivot 52. The arrangement of FIGS. 16 and 17 is otherwise similar to that of FIGS. 12 and 13 and thus operates in a generally similar manner except that the wheels tilt with the vehicle, and that the transverse arm does not remain parallel with the road surface.

Figure 18:
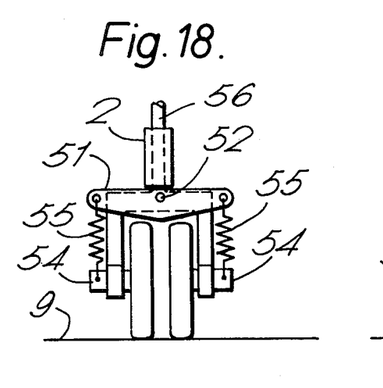
FIGS. 18 and 19 are views similar to those of FIGS. 12 and 13 of a still further transvers arm construction.
Figure 19:
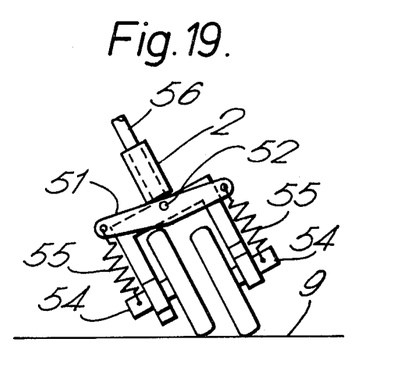

FIGS. 18 and 19 show a further four wheeled configuration, and in which double front wheels are arranged close together with both coupled to the steering column by way of suspension arms 54 in a manner similar in principle to that provided for the single front wheel of the above considered three wheeled vehicles. These double front wheels are resiliently connected by springs 55 to a transverse arm 54 mounted to the steering column.

FIG. 18 illustrates the arrangement with the main chassis section 2 in an upright position whilst FIG. 19 illustrates the arrangement with the main chassis section in an inclined position. In this embodiment a hydraulic or other control means is not interposed between the pivoted arm 51 and the main chassis section 2. However, such a means could be used if thought necessary. The advantage of the embodiment of FIGS. 18 and 19 is that it provides increased adhesion whilst retaining generally similar steering characteristics to those pertaining to the single front wheel embodiments.

Figure 20:
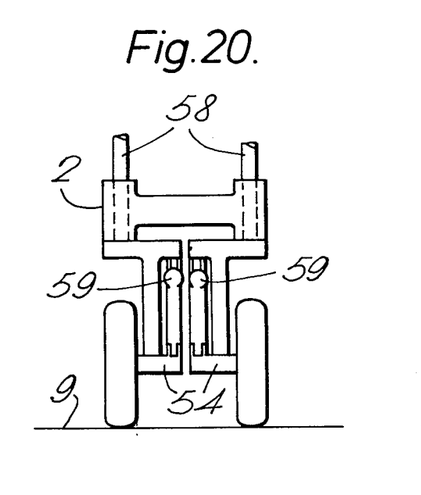
FIGS. 20 and 21 are views of a further front wheel arrangement for a four wheeled version of the vehicle.
Figure 21:
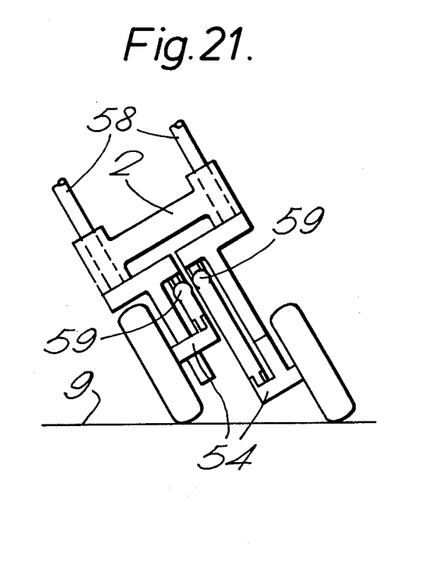

FIGS. 20 and 21 show a further four wheeled embodiment which has two front wheels spaced wider apart as compared with the embodiment of FIGS. 18 and 19, each wheel being resiliently attached to a separate steering column 58 by a pivoted suspension arm or arms 54 the movement of which is controlled by suitable suspension means 59 such as hydro-pneumatic strut means. The two steering columns 58 are connected together mechanically in such a way that both turn together to steer the vehicle. The rear wheels (not shown) are connected directly to the main chassis section 2 by suspension arms controlled likewise by hydro-pneumatic struts (not shown). The hydro-pneumatic struts at the front and rear are connected to the hydraulic tilt control mechanism in such a way that movement of the suspension arms is used additionally to induce and control tilt of the vehicle.

It will be understood that while the pivoted transverse arm 51 provides a relatively simple construction of this form of mechanism, the pivoted arm may well, in practice, be mounted in other positions. For example, longitudinally of the vehicle, by being connected resiliently to levers mounted to the suspension arms in a manner providing the same or similar mechanical effect as that afforded by the previously discussed arrangements.

The essential nature of the vehicle of the invention is its narrow width for a closed-in vehicle in that it has a width of less than one meter. For example, 700 to 900 millimeters in width. In conjunction with this narrowness the vehicle is stabilised on corners by a tilting motion positively controlled from within the body of the vehicle. As a direct result of these attributes the vehicle is able to operate in large numbers as a convenient means of personal transport on existing road networks in central city or town areas without causing the degree of traffic congestion that would be caused by an equal number of conventional cars or the like.

I claim:

1. A road vehicle, comprising a chassis structure, suspension means including road running wheels mounted to the chassis structure, means for enabling steerable displacement of at least one of the road wheels with respect to the other wheels and the chassis structure, means for mounting a prime mover and associated transmission on the chassis structure for transmitting drive to at least one of the road wheels, a body for encompassing at least one person mounted upon the chassis structure and symmetrically positioned with respect to a perpendicular medial plane of the chassis structure, the body being tiltable relative to the medial plan and to at least a part of the chassis structure, and user actuatable means for selectively tilting the body structure comprising:

(a) means for producing relative tilt between the body structure and a portion of the chassis structure;
 (b) a right foot operable pedal mounted to the body structure;
 (c) a left foot operable pedal mounted to the body structure;
 (d) a control connection between the right pedal and the tilt producing means such that operation of the right pedal produces a tilt of the body structure towards the right side of the medial plane; and (e) a control connection between the left pedal and the tilt producing means such that operation of the left pedal produces a tilt of the body structure towards the left side of the medial plane.

2. A road vehicle as claimed in claim 1 wherein the two control connections include means for servo-assisting the operation of the associated pedal operation in producing a desired tilt of the body structure.

3. A road vehicle as claim in claim 1 wherein the means for producing relative tilt includes a hydraulic piston and cylinder arrangement connected between the body structure and the chassis structure each of said control connections includes a hydraulic ram hydraulically coupled with the piston and cylinder arrangement by way of fluid conduits, each hydraulic ram being additionally connected so as to be operated on depression of the associated pedal to thereby cause corresponding operation of the piston and cylinder arrangement and produce the desired tilt of the body structure.

4. A road vehicle comprising
(a) a chassis structure including a first section, a second section and a pivoted connection between the two sections defining an axis extending in the longitudinal direction of the chassis structure and lying in a medial plane thereof;
(b) suspension means including a road running wheel arrangement mounted to each said sections of the chassis structure;
(c) a steering means for enabling steerable displacement of at least one of the road running wheel arrangements with respect to the chassis structure;
(d) means for mounting a prime mover to the first section of the chassis structure;
(e) means for transmitting drive from the prime mover to at least a selected one of the road running wheel arrangements;
(f) a body structure for encompassing at least one person mounted upon the second section of the chassis structure so as to be symmetrically positioned with respect to the medial plane of the chassis structure and so as to be bodily tiltable with the second chassis section relative to the first chassis section;
(g) user actuatable means for producing relative tilt between the body structure and the first chassis section, the user actuatable means including,
  (i) first and second user operable foot pedals mounted with respect to the body structure and second chassis section so as to be located one to the left side of the medial plane and one to the right side of the medial plane;
  (ii) means for producing relative tilt of the first chassis section relative to the second chassis section,
  (iii) an operational control connection between the first pedal and the means for producing tilt, and
  (iv) an operational control connection between the second pedal and the means for producing tilt,
  (v) each said control connection being such that operation of its associated foot pedal causes the second chassis section to tilt relative to the first chassis section in a direction towards the same side of the medial plane as the operated foot pedal.

* * * * *